Dec. 27, 1932.  F. M. REID  1,892,004
TRACTOR TRAILER COMBINATION
Filed Nov. 13, 1930  2 Sheets-Sheet 1
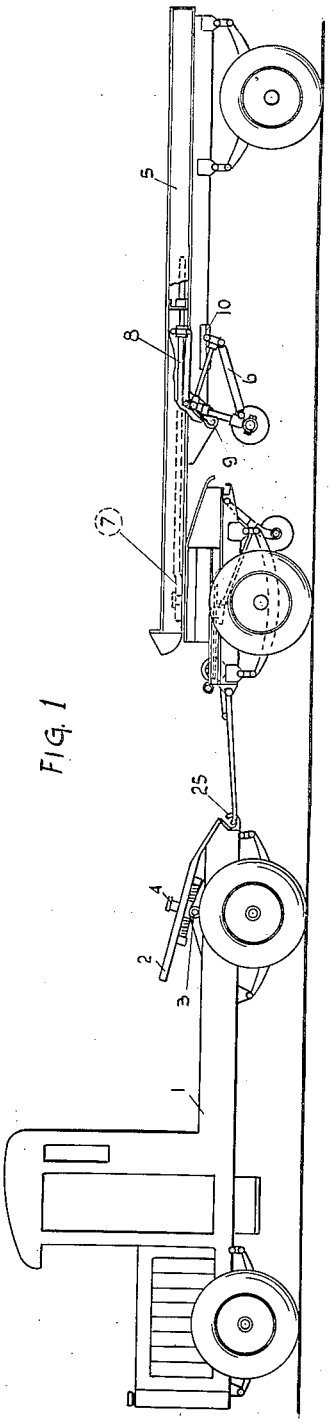
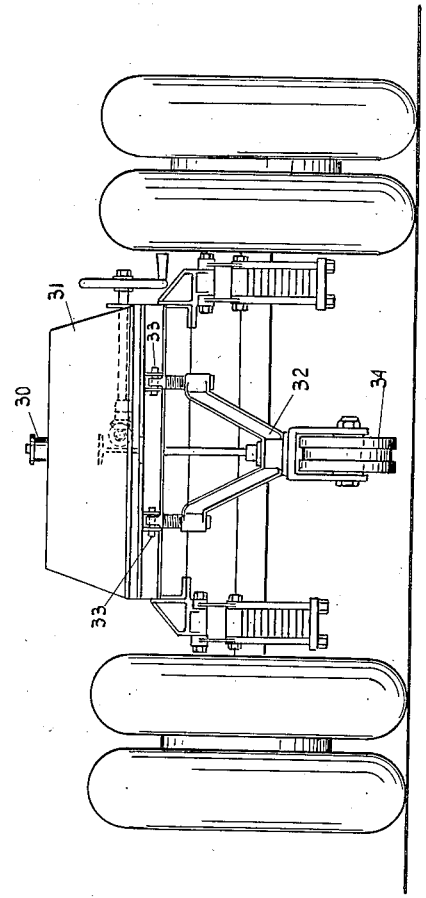
INVENTOR.
FREDERICK M. REID
BY Barnes & Kisselle
ATTORNEYS.

Dec. 27, 1932.  F. M. REID  1,892,004
TRACTOR TRAILER COMBINATION
Filed Nov. 13, 1930  2 Sheets-Sheet 2
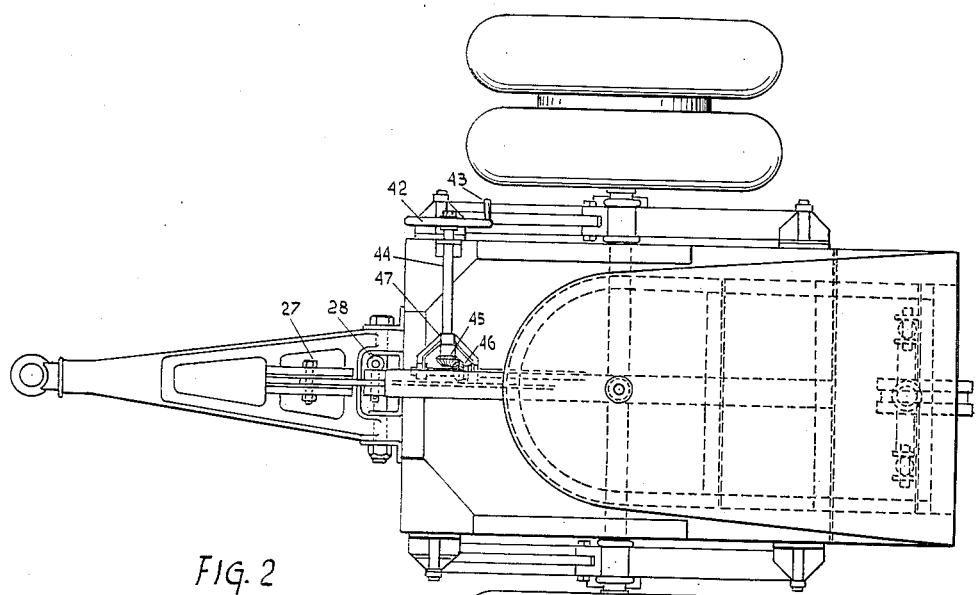
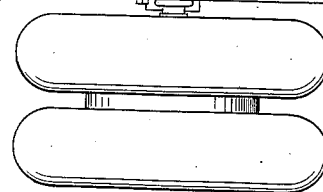
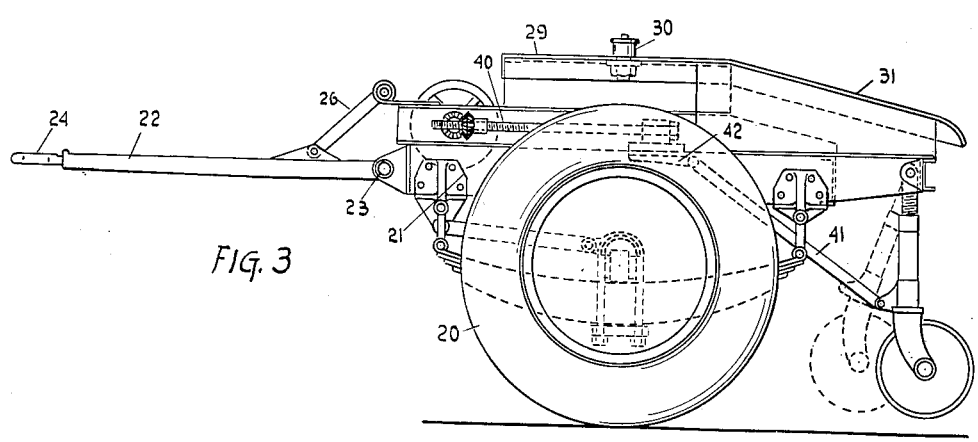
INVENTOR.
FREDERICK M. REID
BY
Barnes & Kisselle
ATTORNEYS.

Patented Dec. 27, 1932

1,892,004

UNITED STATES PATENT OFFICE

FREDERICK MALCOLM REID, OF DETROIT, MICHIGAN, ASSIGNOR TO FRUEHAUF TRAILER COMPANY, OF DETROIT, MICHIGAN, A CORPORATION OF MICHIGAN

TRACTOR-TRAILER COMBINATION

Application filed November 13, 1930. Serial No. 495,359.

This invention has to do with road vehicles and it is concerned principally with tractor-trailer combinations. More particularly, the invention is directed to the provision of a combination which embodies generally a tractor, a trailer, and what may be termed a dolly wherein the trailer may be used in combination with the tractor alone after the manner of what is known as a tractor-semi-trailer combination, or by embodying the dolly, the trailer may take the form of a full or four-wheel trailer. The invention is also concerned with the particular construction of the dolly.

In the accompanying drawings:

Fig. 1 is a side elevational view in illustration of a tractor, semi-trailer, and dolly with the semi-trailer and dolly forming together a full or four wheel trailer.

Fig. 2 is a top plan view of the dolly.

Fig. 3 is a side elevational view thereof.

Fig. 4 is a rear end view of the dolly.

A tractor is illustrated at 1, and on the rear end of the tractor frame there may be a lower fifth wheel member 2 which may advantageously be pivoted, as at 3, so that it rocks and may be provided with a king pin 4. The fifth wheel may be mounted so as to normally incline, as shown in Fig. 1. A semi-trailer, shown at 5, is provided with rear supporting wheels, a supporting structure 6 and a latch or lock 7 which may be connected as by means of service bar 8 to support 6.

This tractor and semi-trailer arrangement is more or less automatic, and as is understood by those skilled in the art, the trailer when detached from the tractor is supported by the support 6. The tractor may back into the semi-trailer and the inclined lower fifth wheel rides in under the forward end of the trailer eventually lifting it, and then the latch or lock 7 engages king pin 4 to secure the tractor and semi-trailer together. When the arrangement is more or less automatic the latch 7 may be movable so that is may be pushed rearwardly by the king pin to actuate the support 6 so as to more or less fold it up or lift it from operative position. In the present instance the support is mounted in slides 9 and 10 after the manner shown in Patent #1,611,947. This showing of tractor and semi-trailer is exemplary only of a particular construction which may be employed as it will be appreciated that various other types of fifth wheels, supports, couplings, etc., may be used. The support need not be automatically lifted when the two vehicles connect. The king pin may be on the trailer with the lock or catch on the tractor.

What may be termed a dolly is shown in Fig. 3 having wheels 20, frame 21, together with an axle and spring mounting. A hinged tongue 22 is connected to the frame, as at 23, and it is provided with an eye 24 for cooperation with a hook or suitable draft device 25 on the tractor. A link 26 interconnects the tongue and frame, and the link may be pivoted to the tongue, as at 27, connected to the trailer by a removable pin 28. The purpose of this will later be brought out. A suitable lower fifth wheel construction is provided on this dolly and it may take the form of a plate 29 provided with king pin 30. The rear end may be inclined as at 31.

An auxiliary supporting device is preferably provided and it may take the form of a frame member 32 pivotally connected to the dolly frame as at 33 and carrying a ground-engaging castor wheel 34. This auxiliary support is movable on its pivotal connections 33 into and out of operating position, and any suitable means may be provided for accomplishing this. An advantageous construction is the provision of a reciprocating screw shaft 40 connected by a link 41 through the means of a reciprocating head 42, to the support. A control wheel 42 which may have a handle 43 is mounted upon shaft 44 and carries a pinion 45 meshing with pinion 46. Pinion 46 and 45 are held in mesh by a suitable frame or bracket 47 in which the shafts 44 and 40 may be journaled. It will be appreciated that an operator turning the wheel 40 resulting in rotation with the pinions causes the shaft 40 to be reciprocated one way or the other by reason of its screw, it being understood that the pinion 46 is internally screw threaded.

In road vehicles the advantages of carrying the loads on a full trailer or semi-trailer rather than entirely upon the tractor is well appreciated. In many types of work it is advantageous to employ semi-trailers wherein the front end of the trailer when in use rests upon the front end of the tractor. In this way, for example, the semi-trailers may be left detached from the tractor while loading and unloading with the tractor and another semi-trailer in transit. However, it is sometimes more advantageous to have full trailer; that is to say, a four wheel trailer, self-sustaining, wherein a number of them can be hitched behind a tractor after the manner of a train. Large bulky loads can thus be advantageously transported because the tractor can draw several trailers. However, this means that a single operator of a fleet of vehicles would need a set of semi-trailers and a set of full trailers. It is here that the present invention makes it possible to readily convert a semi-trailer into a full trailer so that a single operator equipped with a tractor and some semi-trailers need only have some dollies available instead of a fleet of full trailers. As shown in Fig. 1, a semi-trailer can be mounted upon the dolly and the dolly and semi-trailer thus form a full or four wheel trailer.

In using the dolly, it may be backed in under the semi-trailer and the semi-trailer rides up the incline 31 and the coupling is made on the king pin 30 the same as it is on the king pin 4 of the tractor. It is necessary, however, to stabilize the dolly during this coupling action, else the dolly will not stand with its frame uppermost due to the fact that the tongue is pivoted. In fact, the dolly is not stable in itself except when the link 26 is attached as shown in Fig. 3, which makes the tongue rigid so that the dolly can be handled like a cart. Accordingly, when the dolly is pushed under the trailer, the support 32 is placed in operating position, as shown in the full lines of Fig. 3 so that the castor wheel takes the weight. When the trailer rides up over the plate 29 the dolly is caused to become erect, as shown in Fig. 1 and is so held by the weight of the trailer. When operating with the dolly and semi-trailer, the link 26 is detached, as shown in Fig. 1, thus the tongue 22 being merely a pivoted draw bar. Also the auxiliary support may be shifted to inoperative position, as shown in Fig. 1.

There may be times when it is necessary to transport the dolly alone, and at this time the link 26 is hooked to the dolly frame, as shown in Fig. 3, thus making the tongue rigid with the frame so that the dolly can be drawn like a cart, at which time the auxiliary wheel is not in use.

One advantage of this construction is that as the semi-trailer and dolly are operated as a unit, the front wheels constituted by the dolly are held in position by the fifth wheel and it is not necessary for the tongue to play any part in stabilizing the dolly. Thus it is easy to disconnect the full trailer from the tractor, and in so doing there is no danger of the tongue 22 whipping, to the probable injury of the operator by reason of overbalanced trailer weight on the dolly. In other words, by reason of the lower fifth wheel on the dolly being rigid and not pivoted, the dolly is stabilized when operated with the semi-trailer, and does not rely upon the tongue for stabilization.

I claim:

1. The combination of a tractor, a normally inclined rocking fifth wheel on the tractor, a semi-trailer underneath one end of which the tractor is adapted to move whereby said trailer is elevated by the inclined fifth wheel, an upper fifth wheel rigid on the semi-trailer for connection to the lower fifth wheel on the tractor, a dolly comprising a wheeled axle and frame, a lower fifth wheel rigid with the frame, an incline fixed as regards the frame, a tongue pivoted to the dolly arranged to be connected to a tractor, said dolly being adapted to be backed under a semi-trailer whereby the same is lifted by the incline and the upper and lower fifth wheel members connected, and auxiliary means for engageing the ground and supporting the dolly frame against substantial tipping as the trailer rides up the incline.

2. The combination of a tractor, a normally inclined rocking fifth wheel on the tractor, a semi-trailer underneath one end of which the tractor is adapted to move whereby said trailer is elevated by the inclined fifth wheel, an upper fifth wheel rigid on the semi-trailer for connection to the lower fifth wheel on the tractor, a dolly comprising a wheeled axle and frame, a lower fifth wheel rigid with the frame, an incline fixed as regards the frame, a tongue pivoted to the dolly arranged to be connected to a tractor, said dolly being adapted to be backed under the semi-trailer whereby the same is lifted by the incline and the upper and lower fifth wheel members connected, auxiliary means for engaging the ground and supporting the dolly frame against substantial tipping as the trailer rides up the incline, said auxiliary means comprising a movable structure and means for moving it to and from operative position.

3. The combination of a tractor, a normally inclined rocking fifth wheel on the tractor, a semitrailer underneath one end of which the tractor is adapted to move whereby said trailer is elevated by the inclined fifth wheel, an upper fifth wheel rigid on the semi-trailer for connection to the lower fifth wheel on the tractor, a dolly comprising a wheeled axle and frame, a lower fifth wheel rigid with the frame, an incline fixed as regards the frame, a tongue pivoted to the dolly arranged to be connected to a tractor, said dolly being adapted to be backed under a semi-trailer whereby the same is lifted by the incline and the upper and lower fifth wheel members connected, auxiliary means for engaging the ground and supporting the dolly frame against substantial tipping as the trailer rides up the incline, said auxiliary means comprising a movable structure, means for moving it to and from operative position, and a caster wheel on said movable structure for engaging the ground.

4. A dolly for use with a tractor and a semi-trailer in which the semi-trailer has an upper fifth wheel member under its forward end comprising, a wheeled axle, a frame on the axle, a fifth wheel member rigid with the frame, a downwardly and rearwardly inclined member leading to the fifth wheel which is also rigid with the frame, a tongue for connection to a tractor, means pivotally mounting the tongue to the dolly frame, said dolly being adapted to be pushed under the front end of the trailer with the trailer riding up the inclined member, an auxiliary support movable into and out of ground engaging position, and located substantially under the inclined member for stabilizing the dolly as the same is pushed under a trailer, and means for connecting the tongue to the dolly frame rigidly whereby the dolly only may be towed by a tractor.

5. A dolly for use with a tractor and a semi-trailer in which the semi-trailer has an upper fifth wheel member under its forward end comprising, a wheeled axle, a frame on the axle, a fifth wheel member rigid with the frame, a downwardly and rearwardly inclined member leading to the fifth wheel which is also rigid with the frame, a tongue for connection to a tractor, means pivotally mounting the tongue to the dolly frame, said dolly being adapted to be pushed under the front end of the trailer with the trailer riding up the inclined member, an auxiliary support movable into and out of ground engaging position, and located substantially under the inclined member for stabilizing the dolly as the same is pushed under a trailer, a link, and means connecting the ends of the link to the tongue and dolly frame, respectively, for rendering the tongue rigid with the dolly frame whereby the dolly only may be towed by a tractor, the means connecting at least one end of the link being readily detachable.

6. A dolly for use with a tractor and a semi-trailer in which the semi-trailer has an upper fifth wheel member under its forward end comprising, a wheeled axle, a frame on the axle, a fifth wheel member rigid with the frame, a downwardly and rearwardly inclined member leading to the fifth wheel which is also rigid with the frame, a tongue for connection to a tractor, means pivotally mounting the tongue to the dolly frame, said dolly being adapted to be pushed under the front end of the trailer with the trailer riding up the inclined member, an auxiliary support movable into and out of ground engaging position, and located substantially under the inclined member for stabilizing the dolly as the same is pushed under a trailer, and means for connecting the tongue to the dolly frame rigidly whereby the dolly only may be towed by a tractor, said auxiliary support comprising legs pivotally connected to the dolly frame, a ground engaging caster wheel carried by the legs, and means operable to shift the legs on their pivotal connection out of ground engaging position.

In testimony whereof I affix my signature.

FREDERICK M. REID.